United States Patent [19]

Zampieri

[11] Patent Number: 4,909,576

[45] Date of Patent: Mar. 20, 1990

[54] ANTISKID DEVICE FOR MOTOR VEHICLES

[75] Inventor: Placido Zampieri, Verona, Italy

[73] Assignee: Raffaele Freddo, San Martino di Buon Albergo-Vr, Italy; a part interest

[21] Appl. No.: 64,732

[22] Filed: Jun. 22, 1987

[30] Foreign Application Priority Data

Jun. 25, 1986 [IT] Italy .................... 84934 A/86

[51] Int. Cl.⁴ .............................................. B60B 15/26
[52] U.S. Cl. .................................. 301/44 T; 152/53; 152/417
[58] Field of Search .................... 301/43, 44 T, 45, 46, 301/47; 152/208, 53, 417

[56] References Cited

U.S. PATENT DOCUMENTS 2,714,042  7/1955  Kelly ........................ 301/47
3,184,268  5/1965  Blindenbacher et al. ........ 301/45
4,685,743  8/1987  Sakurai ..................... 301/47 X

*Primary Examiner*—Merrell C. Cashion, Jr.
*Assistant Examiner*—Gregory J. Wilber
*Attorney, Agent, or Firm*—Guido Modiano; Albert Josif

[57] ABSTRACT

Antiskid device for the advance on snow or ice of the driving wheels of motor vehicles. The device is wheel-shaped and has a central hub portion intended to be applied and fixed to the outside of a driving wheel of a motor vehicle, a peripheral deformable crown with a spiked or jagged contour for gripping the roadbed and a plurality of spring-loaded and fluid-operated telescopic spokes to allow the crown to yieldingly deflect, so as to lose its normal circular shape at the portion of the crown gripping the roadbed and to resume and keep its normal circular shape in all its remaining portions.

The amount of the extension/retraction of the spokes can be controlled remotely from inside the vehicle to which the device is applied.

6 Claims, 9 Drawing Sheets

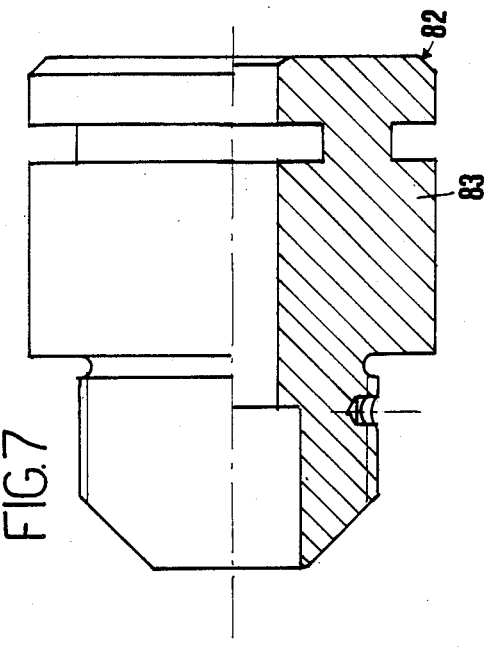
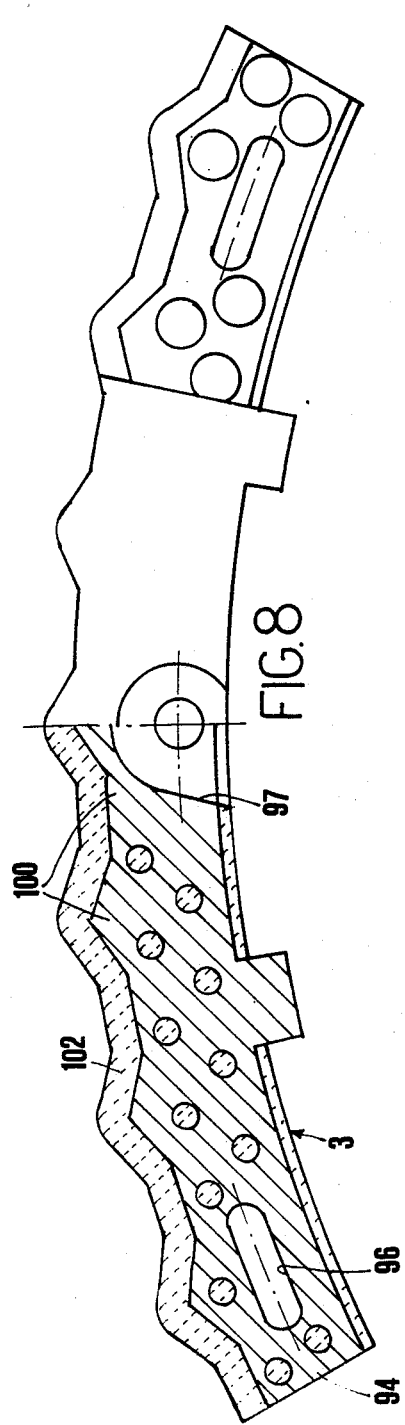
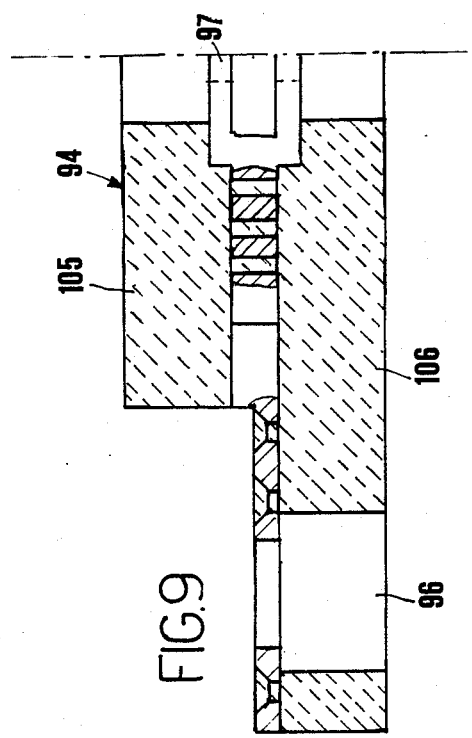

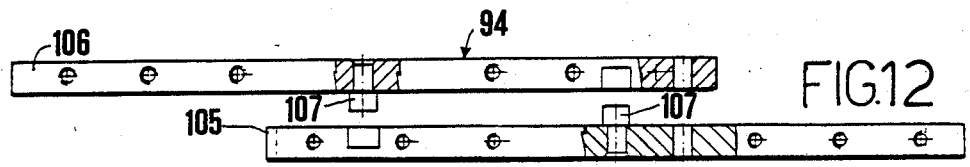
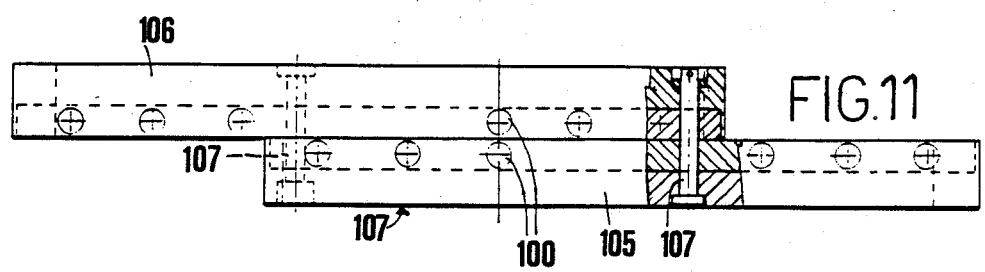
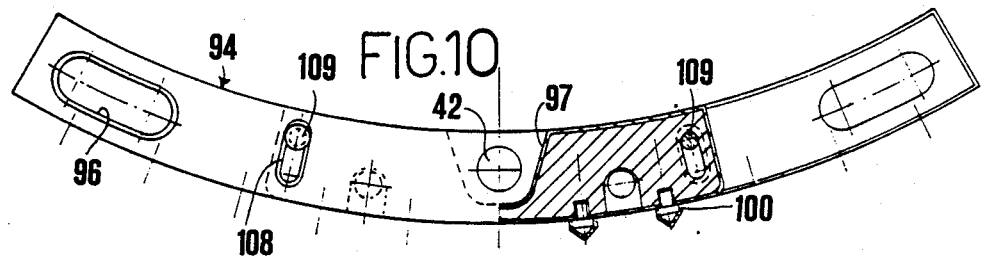
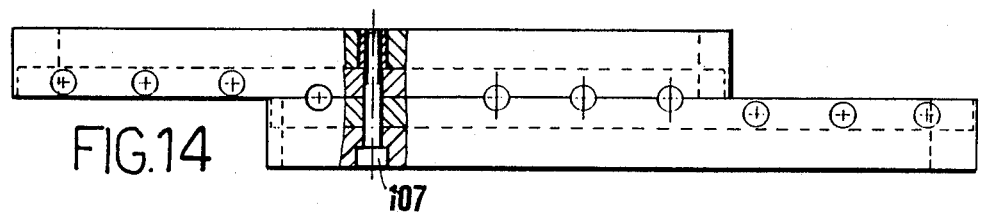
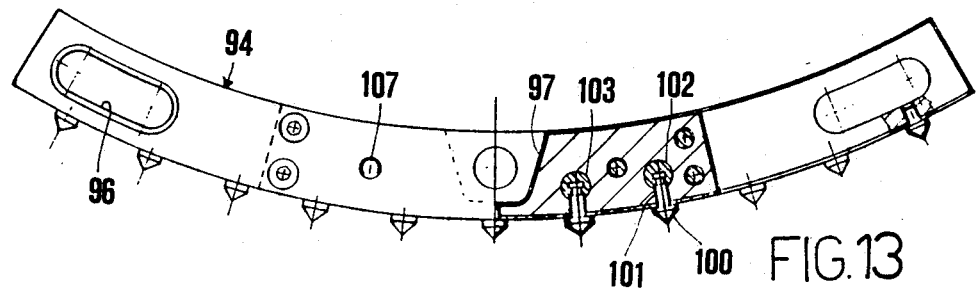

ANTISKID DEVICE FOR MOTOR VEHICLES

BACKGROUND OF THE INVENTION

The present invention relates to an antiskid device for the advance on snow or ice of the driving wheels of motor vehicles.

For safer advance on icy or snowy beds both of automobiles and of non-tracked heavy motor vehicles, so called spiked tires, or, more commonly, traditional skid chains, wound around the tread of the wheels, are usually employed. If on one hand spiked tires satisfactorily solve the problem of the grip of wheels on icy surfaces, on the other hand they are expensive, entail a tire replacement operation which must be performed by a tire repairer and are rather inefficient on snowy surfaces. On the other hand the disadvantages of skid chains, including the difficulty and the discomfort in application and the undesired stresses which they impart to the supports and to the axles of the vehicle, for example on an icy surface, are well known.

SUMMARY OF THE INVENTION

An object of the present invention is to provide a new antiskid device which, though ensuring the achievement of all the advantages obtainable both with spiked tires and with skid chains, is not subject to their limitations.

Another object of the present invention is that said antiskid device constitutes a substantial technical innovation in the field of motor vehicle antiskid systems.

Another object of the present invention is that said antiskid device be easily and rapidly applicable to automotive vehicle wheels, be highly reliable and considerably increase driving safety on paths with a low degree of adherence between the wheels and the roadbed.

These and other objects which will become better apparent hereinafter are achieved by an antiskid device particularly for the advance on snow or ice of the driving wheels of motor vehicles, said device being characterized in that it comprises a wheel-shaped structure having a hub portion which is securable to the outside of a wheel of a motor vehicle, a peripheral deformable crown suitable for gripping the roadbed, and a plurality of spoke elements angularly spaced apart and adapted for resiliently connecting the hub portion with the crown, so as to allow the latter to assume a configuration different from a circular one at its portion gripping the roadbed and to resume and keep its circular shape in all its remaining portions.

Advantageously each spoke element is telescopingly extendable and retractable.

BRIEF DESCRIPTION OF THE DRAWINGS

Further features and advantages of the invention will become apparent from the following detailed description of some preferred, but not exclusive, embodiments thereof, described only by way of non-limiting examples with reference to the accompanying drawings, where:

FIG. 7 is an elevation view partly in section of a distributor;

FIG. 8 is an elevation view of a crown section;

FIG. 9 is a view from below of the crown section of FIG. 8;

FIG. 10 is a front elevation view with portions in cross-section of a modification of crown section;

FIG. 11 is a bottom view of the crown section or sector of FIG. 10 coupled to an adjacent sector;

FIG. 12 is an exploded view of the crown sectors of FIG. 11;

FIG. 13 is a view, similar to FIG. 10, but illustrating another embodiment of crown section;

FIG. 14 is a bottom view of FIG. 13;

DESCRIPTION OF THE PREFERRED EMBODIMENTS

Figure 1:
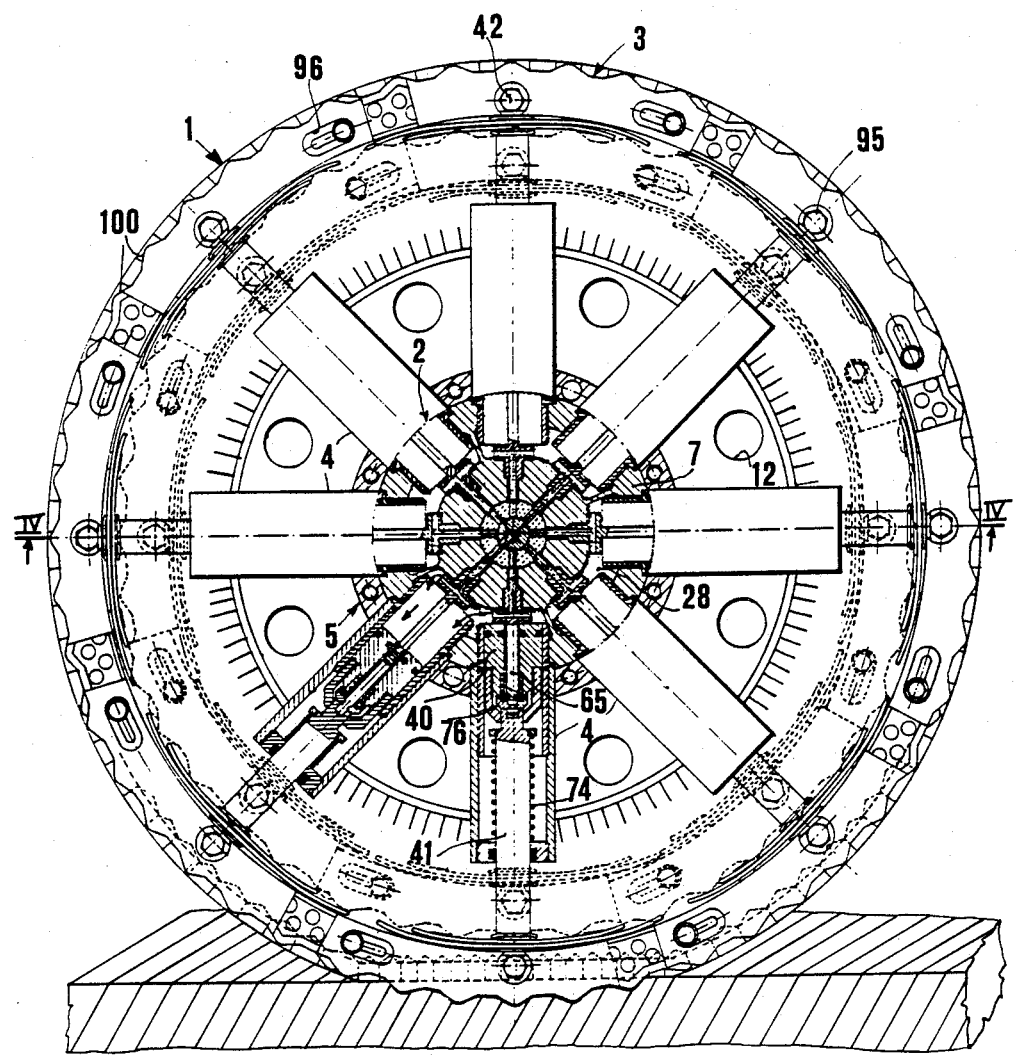
FIG. 1 is a front view of an antiskid device according to the invention, in operative or expanded position.
Figure 2:
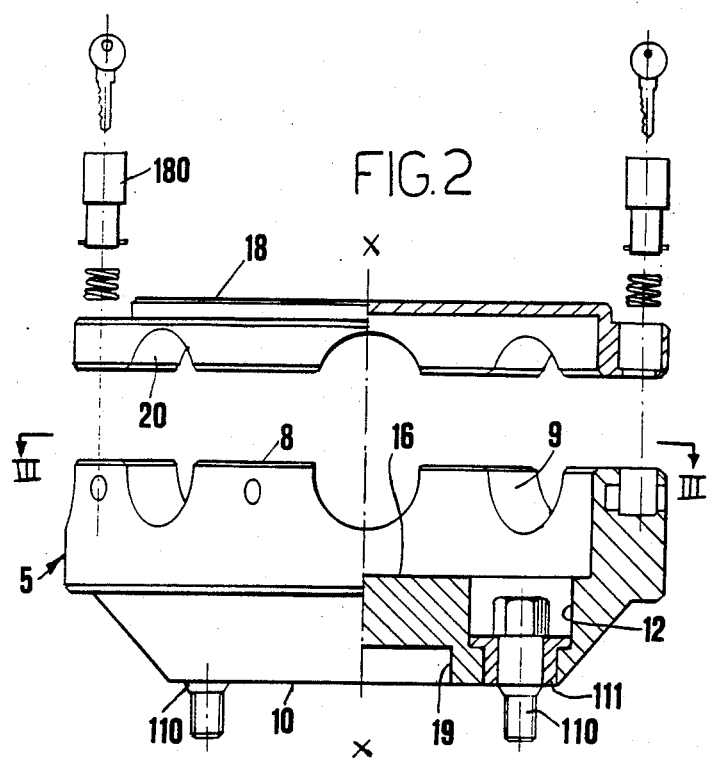
FIG. 2 is an explosion view partly in cross-section of a coupling support for the antiskid device.
Figure 3:
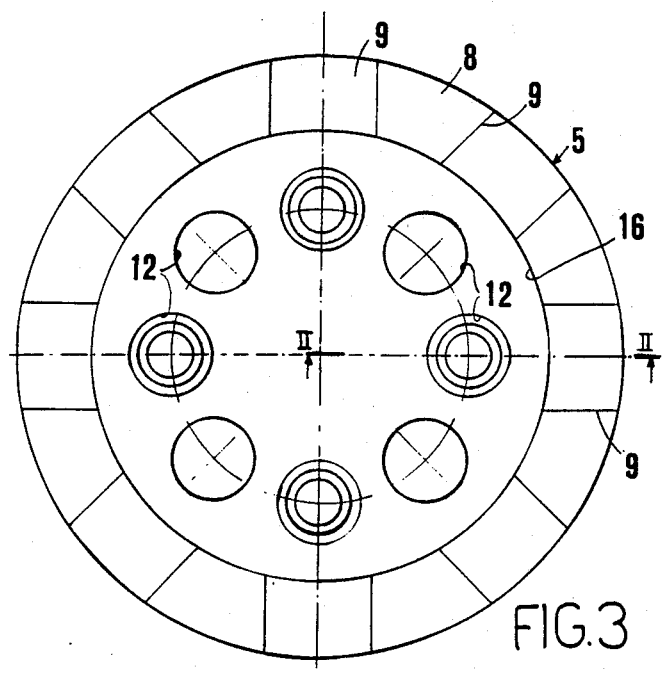
FIG. 3 is a top section view along the line III—III of FIG. 2.

With reference to the above described Figures, it can be observed that an antiskid device according to the present invention substantially comprises a deformable wheel 1 having a central hub portion 2, a peripheral crown 3 and telescopic spokes 4 for coupling the hub to the crown, arranged at uniform angular distances from one another.

The hub portion 2, with particular reference to FIGS. 1 to 7 and 16, comprises a connection or coupling plate 5 intended to be removably and coaxially coupled to the central portion of a driving wheel 6 of a motor vehicle and a spoke-holder head 7 supported by the plate 5. The coupling plate 5 (FIGS. 2 and 3) has an approximately truncated-cone shape and is provided with an outer recessed face 8 formed with a plurality of recesses 9, and a smaller recessed face 10. The head 5 is traversed by through holes 12 having their axes parallel to the central axis X—X of the head and being arranged angularly spaced apart by 45° from one another.

The outer face 8 has an axial recess 16. The smaller face 10 instead has a shallow central recess 19 designed to abut and locate, in use, the hub 17 of a driving wheel 6 of a motor vehicle whereon the device is to be mounted. The head 5 can be covered by a lid 18 which can be secured to it by means of key-operated locks 180.

The spoke-holder head 7 (FIG. 4) is cylindrical in shape and has a plurality of radial bores 20, e.g. eight in number said bores being angularly spaced through 45° from one another and provided with a wider portion or recess 21 at the outer mouth and inwardly communicating with a respective axial radial port or conduit 23. The head 7 has overall dimensions as to be partly accommodated with its inner face 24 within the recess 16 of the plate 5. Between the face 24 of the head 7 and the bottom of the recess 16 there is a plate number 25 which is secured to the head 7 by means of bolts 26 and is arranged to tight seal through gaskets 27 four channels 28 each communicating with two adjacent bores 20. The plate member 25 has an annular protrusion 29 designed to be located in a central recess 30 of the head 5 and to support a ball bearing 31.

The four chambers or channels 28 are each in the shape of a circular sector and distributed at uniform angular distance around the center of the head 7, each intended to connect, directly and without crimps, a respective pair of adjacent bores 20 to allow controlled transfer of fluid between two consecutive and adjacent telescoping spokes 4.

A cylinder 32 is screwed in each radial bore 20 of the head 7, and protrudes radially from the head 7. A sleeve 39 is screwed on the cylinder 32 and reaches the recess 21. The arrangement being such that each sleeve 39 is accommodated and engaged within a respective recess 9 of the plate 5. A slider is slideably located in the cylinder 32-sleeve 39 assembly, and consists for example of a piston 40 whose piston rod 41 extends outwards so as to project out of the sleeve 39, and is pivoted at 42 to the crown 3.

Within the sleeve 39 each piston rod 41 is a slidably supported by two annular guides 43 and 44 spaced from one another by spacing rods 45. Guides 44 is screwed at the remote end of the sleeve 39 and has inner sealing gaskets 46 and an outler sealing gasket 47, whereas guide 43 is located at an intermediate position in the sleeve 39 and is provided with a pair of inner gaskets 48 spaced apart from one another a distance slightly larger than the diameter of one or more radial ports 49 formed in the piston rod 41.

The piston rod 41 has an outer diameter substantially smaller than the inner diameter of the sleeve 39 so that a relatively large gap 50 is delimited therebetween. Moreover, the piston rod 41 has an axial bore 51 which extends from one end thereof, e.g. its end engaged with the piston 40, and is tightly sealed by a plug member 52 screwed in it, whereby an inner cavity 53 is delimited to which a fluid, e.g. oil, can be supplied through the port or ports 49. Cavity 53 also locates two cofronting piston heads 54 and 56 resiliently urged one against the other by a respective spiral spring 57 and 58. More particularly, springs 57 and 58 have each one end secured to its respective piston head and the other end fixed to the plug member 52 (spring 57) or to the piston rod 41. Thus, if the gap 50 is filled with oil and the piston 40 is forced to move outwards (see right hand portion of FIG. 4) oil is forced to pass through port or ports 49 to be transferred from gap 50 to the cavity 53, while at the same time the piston heads 54 and 56 are caused to move apart against the action of springs 57 and 58. When the piston 40 is moved backwards, springs 57 and 58 will urge the piston heads to move one against the other thereby discharging oil from cavity 53, into the gap 50 until the port or parts 49 are moved in the position shown on the left side of FIG. 4, i.e. within the guide member 43 which cuts off communication between gap 50 and cavity 53.

The piston 40 on its front away from the piston rod 41 bears a ferromagnetic face member 59 designed to be attracted by a magnet 60 arranged at the bottom end of the cylinder 32. The member 59 preferably has a transverse recess 59a to provide an increased surface to pressure oil, whereas the magnet 60 may be in the form of a flanged flat element formed with a through hole 61 arranged in fluid communication with the conduit 23 in the spoke-holder head 7.

Figure 4:
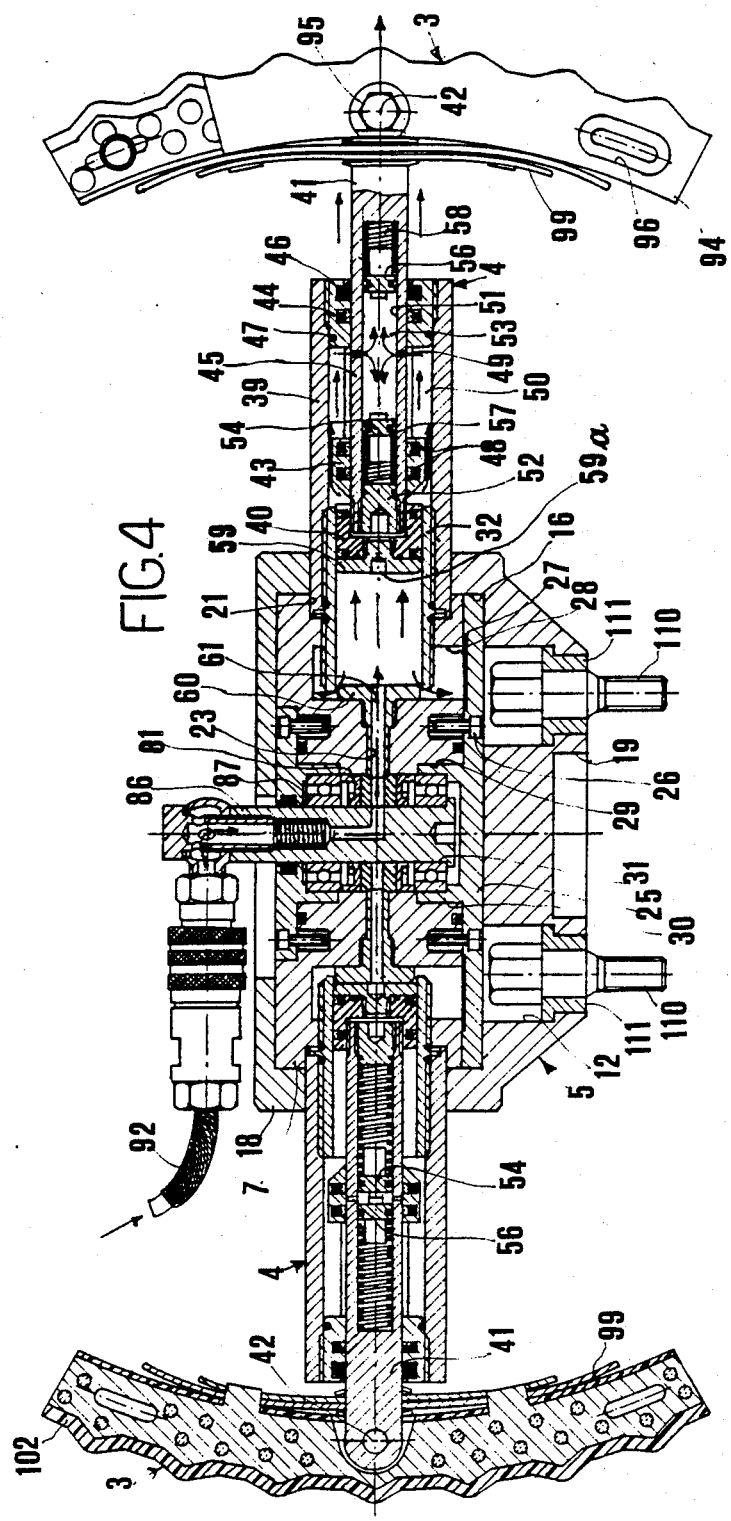
FIG. 4 is a cross section view along the line IV—IV of the antiskid device of FIG. 1 with crown portions rotated through 90°.

Starting from the condition shown on the left half of FIG. 4, if oil under pressure is supplied to conduit 23, thrust is applied to piston 40 and must initially overcome both the magnetic attraction between magnet 60 and member 59 and the resistance to compression of the oil in the gap 50, so as to displace the piston a small distance sufficient to move the port or parts 49 out of the guide member 43 to establish oil communication between gap 50 and cavity 53, after which each telescopic spoke 4 can rapidly and easily expand to erect or enlarge the crown 3.

The telescopic spokes 4 will remain in their expanded condition (right hand portion of FIG. 4) until oil under pressure is supplied to conduit 23. When oil supply is discontinued, the springs 57 and 58 will cause the oil inside cavity 53 to move to the gap 50, thereby also moving the piston 40 towards the magnet 60. As piston 40 approximates the magnet 60 its member 59 is attracted with an increasing force by the magnet, this force contributing in moving the port or ports 49 inside the guide member 43.

The arrangement above described besides making it possible to cause telescopic expansion of the spokes 4 and thus of the crown 3 by remote control, also ensures that in the collapsed or non-erected condition of an antiskid device according to the invention (left side of FIG. 4) each spoke cannot be accidentally expanded by means, such as centrifugal force, other than oil pressure supplied through conduits 23.

Figure 5:
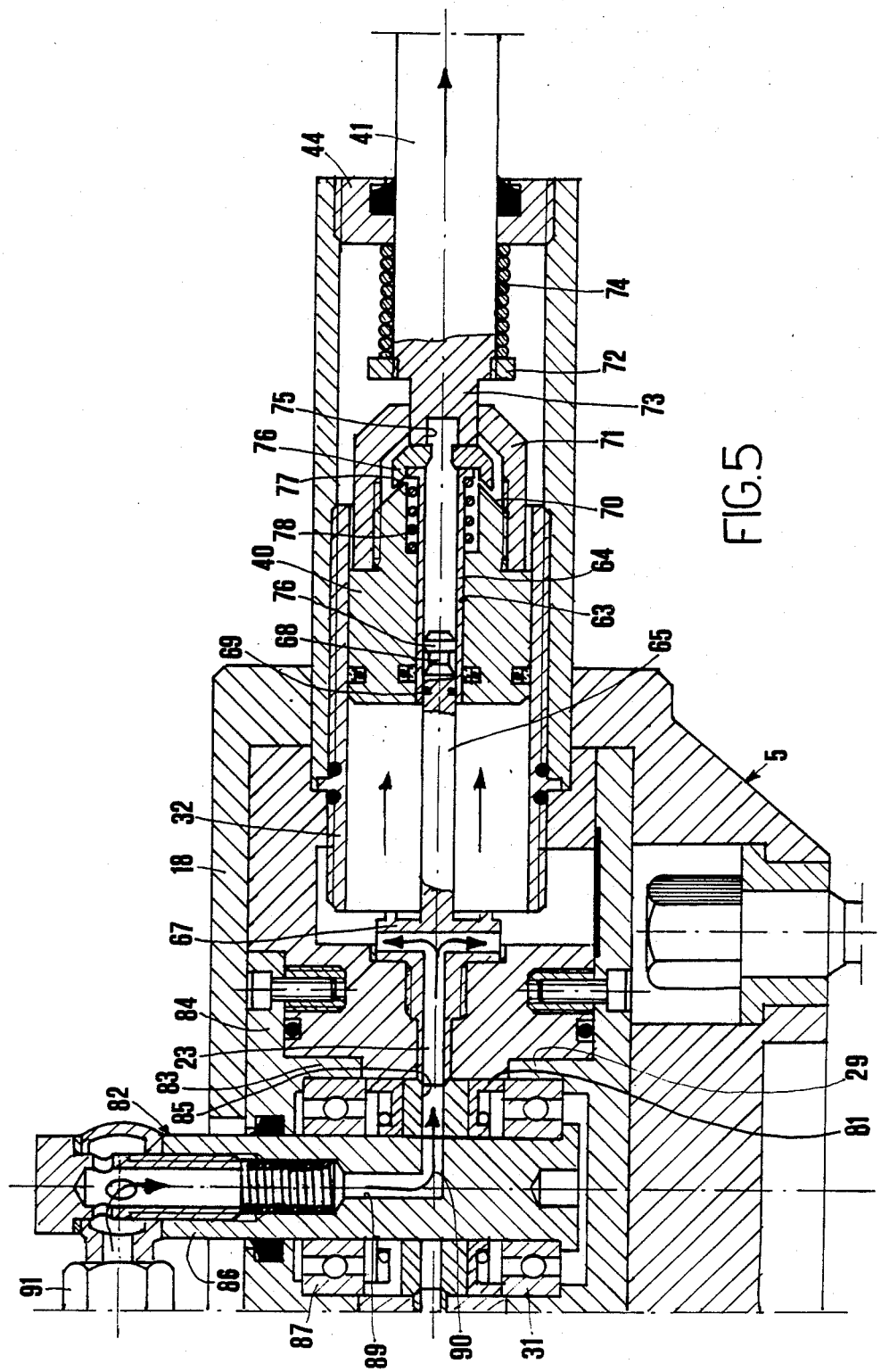
FIG. 5 is a partial cross-section view on enlarged scale of the central portion of the device of FIG. 4 according to another embodiment.
Figure 6:
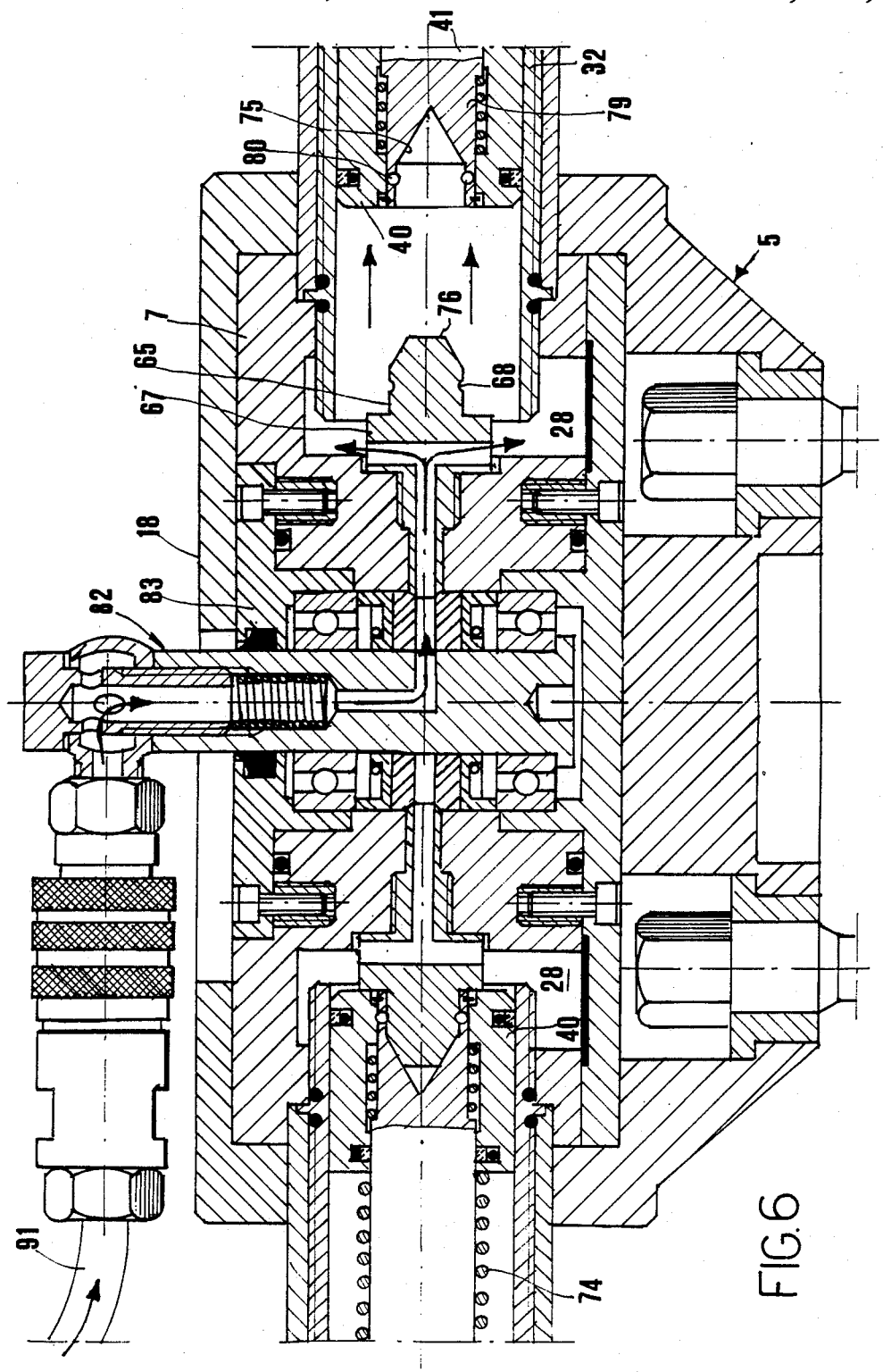
FIG. 6 is a partial cross-section view of a distributor similar to that of FIG. 5 according to a further embodiment.

The embodiments shown in FIGS. 5 and 6 illustrate further structures of telescopic spokes 4 suitable for preventing inadvertent or accidental expansion of an antiskid device. The same reference numerals are used to indicate the same or like components as those shown in FIG. 4.

Piston 40 in FIG. 5 has an inner axial through bore 63 in which a bush 64 is slidably and sealingly located. The bush 64 slidably locates a pin 65 which is integral with a nipple 67, screwed into he head 7 and in communication with the conduit 23. The pin 65 has an annular recess 68 and O-ring 69. At its end away from the nipple 67, the piston 40 is formed with an annular slanting surface 70 and bears a bush 71 screwed in it and surrounding the surface 70.

The piston rod 41 has a flanged end portion 72 and an extension 73 projecting beyond its flange 72. A spiral spring 74 on the piston rod 41 has one end resting against the flange 72 and its other end abutting against a collar guide member 44. The extension 73 is slidably inserted in the bush 71 and has an end recess 75 arranged to receive the tip or head 76 of the pin 65. Between the slanting surface 70 of the piston and the extension 73 of the piston rod, the bush 64 bears two or more jaws 76 each having a slanting surface 77, designed to co-operate with the surface 70 of the piston. A spring 78 is preferably provided between the bush 64 and a piston 40 for a smoother operation.

As will be easily understood when pressure oil is supplied to conduit 23, and thus through nipple 67 to the cylinder 32, the piston 40 is forced to moved forward thereby causing the bush 71 to slide on the extension 73 of the piston rod and to enlarge the jaws 76 owing to sliding and wedge action of its surface 70 acting on surfaces 77 of the jaws. By being moved apart jaws 76 will desengage the groove 68 of the pin 65, whereby the piston and the piston rod are free to prosecute their expansion stroke against the action of spring 74.

As soon as oil supply is discontinued, spring 74 will cause the piston rod 41 and thus the piston 40 to move backwards until piston 40 abuts against the nipple 67 and the pin had is clamped between jaws 76. In this condition, unless oil under pressure is supplied again to conduit 23, the piston assembly is held and locked to the nipple 67.

FIG. 6 shows an embodiment similar to that of FIG. 5. The piston 40 is mounted on the end 79 of the piston rod 41, which is formed with a recess 75 in which a resilient engagement means is provided, such as one or more spring-loaded balls 80. Pin 65 can be very short and has an annular recess 68 arranged to removably engage with the resilient means 80 when the piston assembly is in its retracted condition.

Each conduit 23 communicates with a large seat 81 axially provided in the head 7. The seat 81 is designed to accommodate a fluid distributor generally indicated by the reference numeral 82 (see also embodiment in FIG. 7). The distributor 82 comprises an outer bush or rotor 83 flanged at 84 and intended to rotate together with the head 7.

The bush 83 has a plurality of radial ducts 85 uniformly angularly spaced from one another and equal in number to that of the conduits 23 in the head 7, i.e. equal to the number of the telescoping spokes 4. The ducts 83 are arranged so that their axes are on a same plane of arrangement, perpendicular to the longitudinal axis of the bush.

A cylindrical stator 86 is axially and centrally arranged in the bush 83 and may project outside the head 7 and the lid 18. The stator 86 rests on a pair of ball bearings 31 and 87 located in the bush 83 and has an axial bore 89 which extends from its outer end up to the level of the ducts 85 and communicates with a radial hole 90.

The radial hole 90 is arranged to communicate in sequence with all the holes 85 and thus the conduits 23.

The stator 86 can be sealingly coupled to an elbow 91 connected to a flexible conduit 92 having a relatively small diameter and originating from a control system described further on.

The peripheral crown 3 of the antiskid device according to the invention (FIGS. 1, and 8 to 14) is formed by a plurality of curved sections or sectors indicated at 94 defining a continuous rim all individually articulated at their ends to two respective adjacent crown sections 94 and at their intermediate part, to the end of a respective piston rod 41 of a telescopic spoke 4. For this purpose, each section or sector 94 is provided with lateral circumferential articulation slots 96 and with a central flared recess 97 to accommodate and articulate the ends of the piston rod 41 by means of a pivot 95 with an axis 42 (FIGS. 1 and 4). Adjacent and astride the recess 97, a multileaf spring 99 is provided which can have one of its ends abutting against a section 94 and its other end resting against a section adjacent thereto. In its intermediate part, each spring 99 engages, e.g. it is inserted on and abuts against a respective piston rod 41, thereby facilitating the extension, that is the return to a circular configuration of the crown 3 after a deformation, as will be described hereinafter.

On its peripheral edge, each section 94 is provided with a plurality of projecting points or spikes 100 intended to grip the roadbed. The spikes 100 can have the shape of integral ridges as illustrated in FIG. 8 or of spikes as shown in FIG. 10 which are secured to the respective sector, e.g. by screwing or by inclusion or partial embedding of their stem 101 in a mass 102 of suitable material, such as rubber or a plastic material injected in location holes 103. Rubber or plastic material can also cover the sides of each section 94 and even extend underneath thereof.

As better shown in FIGS. 9 and 11-14, each section 94 can be advantageously constituted of a pair of curved sectors 105 and 106 which are mutually angularly offset so that each projects from an end of the other end joined together by two or more pins or stud bolts 107 or other suitable retention means. By virtue of this offset, each section 94 is provided with ends which are reduced in thickness for coupling to two adjacent sections, whereas in the thicker intermediate portion each section 94 is provided with two adjacent rows of spikes 100.

By way of example two spikes on adjacent sectors 105 and 106 can be spaced approximately 2.5 cm and can be arranged in pairs each defining a transverse front for gripping the ground in a highly effective manner. The pitch or circumferential distance between one pair of spikes and the next, can be, for example, 4-8 cm, preferably 5-6 cm. The rubber 102 covering both the sides and the front of each crown section ensures a better grip on the ground, increases the life of the sectors, protects the couplings of the sections 94 to the piston rods 41 and the articulations between one sector and another, and acts as a sound deadening element.

In the embodiment of FIGS. 10, the sectors 94 are also provided with radially extending slots 108 for the accommodation of a respective articulation pivot 109 to allow adequate mutual movements between the sections 105 and 106.

The configuration in sections of the crown 3 is also advantageous as to the maintenance of an antiskid device. In fact, if one or more of the sections breaks down, for example due to excessive wear of the rubber covering or of the spikes, it is possible to proceed by means of very simple operations with the replacement of the failing sections without the need for replacing the entire crown.

For the application of an antiskid device 1 as described above to a driving wheel 6 of a motor vehicle, initially the plate 5 is placed on the outer face of the wheel. The holes 12 of the plate 5 have a greater diameter than the head of the fixing bolts of the motor vehicle's wheel. Therefore these fixing bolts can be removed and replaced by acting from the outside of the plate 5, with longer bolts 110, one at a time in turn so as to fix both the wheel 6 and the plate 5 to the vehicle.

If desired, the bolts 110 can be fixed in place with a respective spacer 111 located in the holes 12.

After fixing in position of the plate 5, the spoke-holder head 7 with the crown 3 is mounted and fixed thereon by locking in position the lid 18 (FIGS. 1 to 6 and 16).

It will be noted that the application of an antiskid device to a driving wheel of a motor vehicle can occur without the need to raise and lower the motor vehicle and without requiring any other maneuver thereof.

Therefore, its assembly can be effected easily and rapidly even in bad weather: very intense cold on ice, on snow, or the like.

As previously mentioned, the conduit 91 is connected to a hydraulic control system (FIGS. 15 and 16) which comprises an on-off electrovalve 145 arranged to control oil flow on a return duct 146, a reducing valve 147 disposed on the duct 146 downstream of the electrovalve 145, an oil tank 148, a motor-driven pump 149, arranged to pump oil from the tank 148, a delivery duct 150 communicating with the conduit 91, a two-way electrovalve 151 arranged to control oil flow along the duct 150, a duct 152 directly connecting one way of valve 151 to tank 148, an electric or electronic control unit 153 designed to receive electric power from a battery 154 in the motor vehicle through a switch 155 and to be controlled by a brake pedal 156 for the vehicle. With this arrangement upon setting switch 155 on, the control unit 153 sets the motor-driven pump 149 in operation, changes over the electrovalve 151 so as to shuts off communication with conduit 91 and sets electrovalve 145 in its off position, whereby oil from duct 150 returns to the tank 148 via duct 152.

If the brake pedal 156 is depressed, the control unit 153 changes over the electrovalve 151 while electrovalve 145 remains in its off position and oil can flow to the conduit 91 and to each antiskid device 1 mounted on the motor vehicle driving wheels 6. The crown 3 of each antiskid device 1 is thus expanded to its maximum diameter, which is greater than that of the tire of the wheel to which the antiskid device is applied.

When the brake pedal 156 is released, the electrovalve 151 shuts off communication with conduit 91, and opens to duct 152, whereas electrovalve 145 is changed over to its on position. Thus, oil can flow from the conduit 91 to the tank 148. By adjusting the reducing valve 147, oil pressure in the duct 146 can be set at a suitable operating level and the excess of oil is discharged to the tank 148.

Should a lower operating pressure be needed, i.e. a reduction in the expansion level of the antiskid devices 1, valve 147 can be re-adjusted and by depressing then the brake pedal 156, the electrovalve 151 establishes again communication between duct 150 and conduit 91 and the electrovalve 145 is set in its off position. Thus, oil in the antiskid devices 1 will reach the pressure level previously set by the valve 147. When the brake pedal 156 is released, electrovalve 145 is opened and communication between conduit 91 and duct 150 is shut off whereby the whole system is set at the operating pressure and any excess of oil can return to the tank 148.

While braking and the brake pedal 156 is depressed electrovalve 151 is changed over to establish communication between duct 150 and conduit 91 and electrovalve 145 is off. Thus, each antiskid device 1 is caused to further expand its crown, thereby increasing the adhesive force between each driving wheel and the road surface. Upon releasing the brake pedal 156, communication between conduit 91 and duct 150 is shut off and electrovalve 145 is on to let excess of oil to return to the tank 148.

The control system can also comprise one or more two-way electrovalves 158 and 159 which are supplied with oil under pressure through a respective duct 159 and 160 in communication with the delivery duct 150. One way of the electrovalves 157 and 158 is connected to a return duct 161 and 162 leading to the tank 148 and controlled by a reducing valve 163 and 164. The other way of the electrovalves 157 and 158 are communicate with a respective duct 165 and 166.

The duct 165 leads to one or more hydraulic shock absorbers 167 via an on-off electrovalve 168. If the motor vehicle is loaded off center, the vehicle becomes lopsided, and thus a microswitch 169 is actuated and an impulse is sent to the electrovalve 157 which establishes communications between ducts 159 and 165 and at the same time the electrovalve 168 is set in its on position by a relay 170. In this condition oil under pressure is supplied to the or each shock absorber 167, thereby adjusting the side slip angle of the motor vehicle. Oil pressure can be adjusted by acting on the reducing valve 163.

The duct 166 is connected to one or more hydraulic jacks 171 that can be arranged, e.g. hinged, underneath the body of the motor vehicle (see FIG. 16) to be used for instance for lifting one side of the motor vehicle to replace a punctured tire. Each jack 171 is controlled by a respective reducing valve 172 which in turn is controlled by a respective relay 173 and a press-button 174. When a press-button 174 is depressed the electrovalve 158 establishes communication between ducts 160 and 166 and at the same time its respective relay 173 sets is associated valve 170 in its on position. Thus, oil under pressure is supplied to a respective jack 171 to lift the motor vehicle. The oil pressure can be adjusted by acting on the valve 164. If press-button 174 is pressed again, electrovalve 172 and 166 cut off oil supply to the jack 171.

The feeding of compressed oil into the conduits 91 feeds pressure, through the bore 89 and the hole 90 in the cylindrical body 86 of the distributor, to the channels 23 normally full of oil, which apply this pressure through the inner part of the cylinders 32 to the various pistons 40 and piston rods 41 (FIGS. 4, 5 and 6) which are thus forced to extend out of their respective sleeves 39. Thus the crown 3 expands, that is, it passes from a contracted idle position to an extended working position (with a greater external diameter) since its sections 94 can slide and move mutually further apart along the slots 96 and arrange themselves for example in the position illustrated in FIG. 1 so as to have their spikes 100 approximately grazing the outer side of the wheel tread. By adjusting from inside the vehicle the pressure of the fluid fed to the telescopic spokes 4, the driver can adjust as required the diameter of the crown 3 so that it grips more or less intensely the roadbed on which the vehicle is advancing. If the crown 3 is not to grip the ground, for example when it is necessary to pass on snowless or iceless ground, it is sufficient for the driver to remove pressure from the conduits 91, the springs 57, 58, 74,99 of the telescopic spokes then making the crown 3 contract and the piston rods 41 retract in their respective sleeves 39 to assume the contracted position indicated by dotted lines in FIG. 1.

Figure 15:
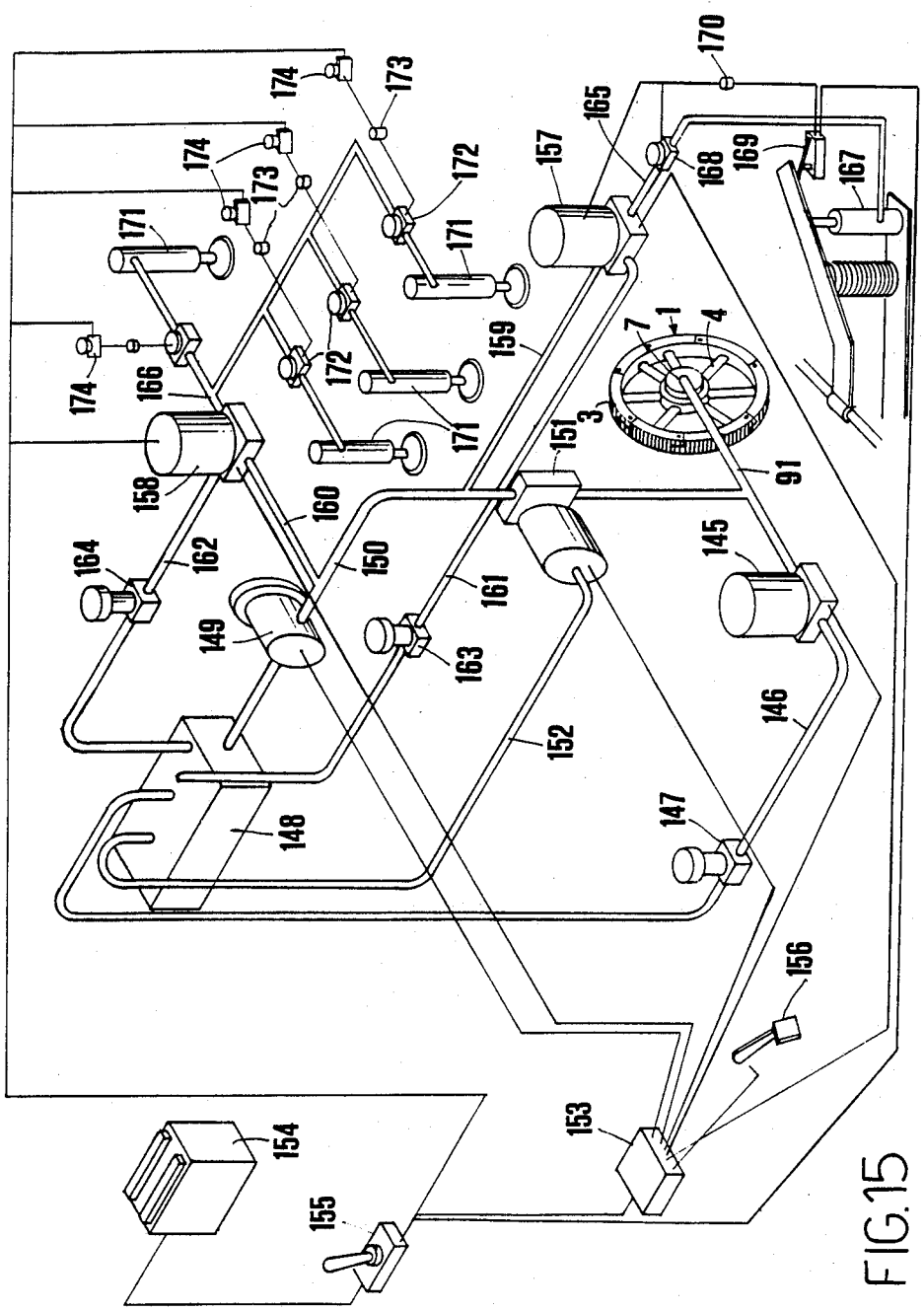
FIG. 15 is a diagrammatic view of a fluid circuit for controlling an antiskid device according to the present invention.
Figure 16:
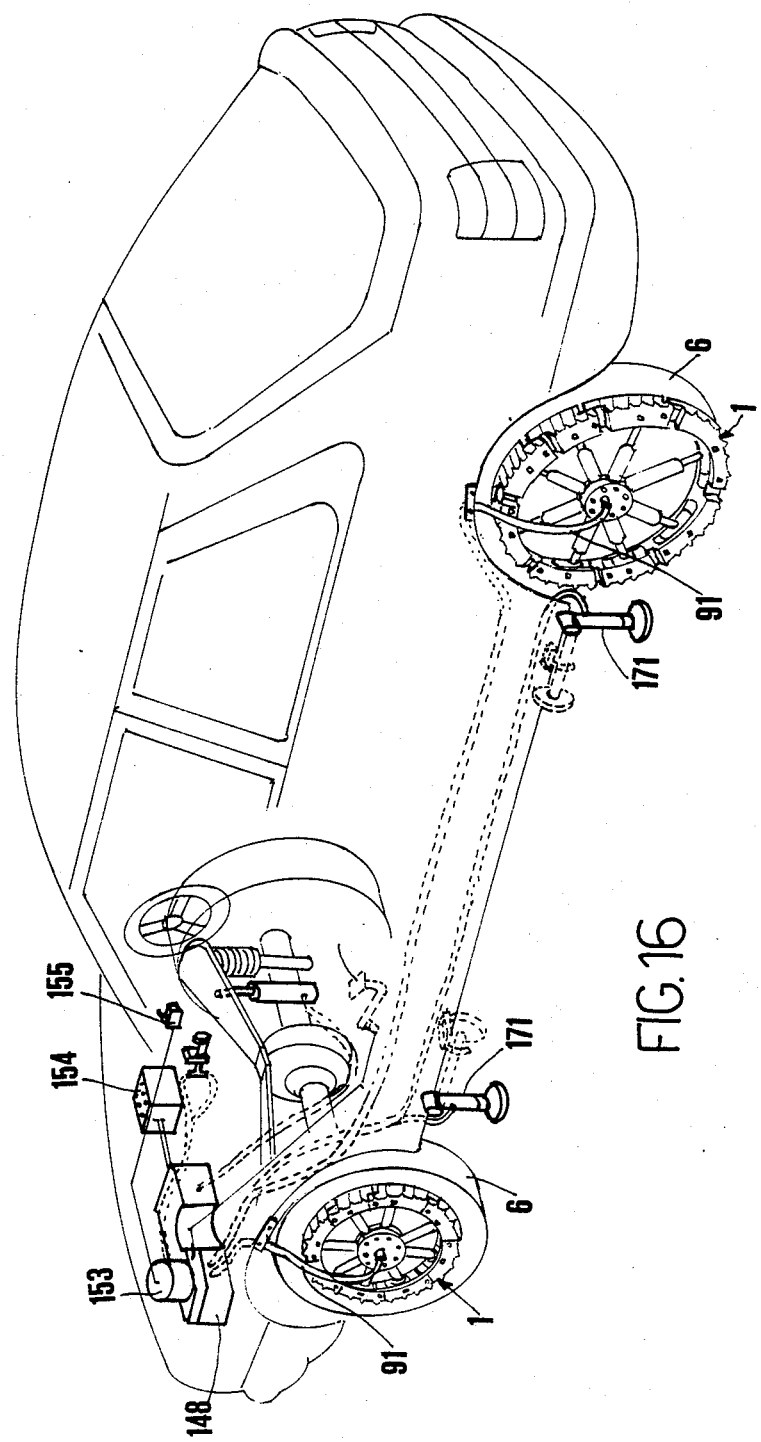
FIG. 16 is a view of an automobile on whose driving wheel is mounted an antiskid device according to the invention.

It should be noted, with particular reference to FIGS. 1 and 15, that when an antiskid device 1 is in an extended position that is, it is gripping the roadbed on which rests the tread of the tire to the side whereof it is arranged, the crown 3 yelds load, while it keeps a substantially circular attitude in its remaining portion. The channels or chambers 28 play an important role in this local deformation, since they allow a given telescopic spoke 4 facing downwards, and therefore under maximum load in a given moment, to retract slightly, to deform the crown 3 by discharging therefrom a small amount of compressed liquid which is discharged therefrom to collect through the respective channel in the telescoping spoke which immediately follows or precedes it with respect to the direction of advance of the vehicle. In this manner, pressures are compensated and the crown 3 is always kept in tension and in contact with the ground along a wide portion of circumference and therefore with an excellent grip on the ground. As a telescopic spoke moves out of the region of maximum load, it is gradually extended like the others, since it receives compressed liquid discharged by the immediately following spoke which is moving into the position of maximum load.

When the driver presses the brake pedal 156, an additional amount of compressed liquid is automatically fed to the telescoping spokes 4, as explained above with reference to FIG. 15, said telescoping spokes being thus extended a little further so as to ensure a better grip when braking on a slippery surface on which the vehicle is advancing, thereby ensuring a more effective and skidless braking action.

In use, the distance between the driving wheel 6 and the crown 3 of the antiskid device is such as to allow the compression of the tire in its portion resting on the ground. The compression of the tire is actually desirable to close the interspace between the tread and the crown 3, which can be of some millimeters, to avoid the jamming of obstacles, such as pebbles, blocks of ice and the like. The latter, in any case, even if they jammed between the tire and the crown 3, would be expelled immediately after, while the vehicle is moving, by the centrifugal force, since the tire would no longer grip the obstacle beyond the lower compression region.

The invention thus conceived is susceptible to numerous modifications and variations within the scope of the protection defined by the following claims.

Thus, for example, at the outlet of the pump 149 it is possible to provide a by-pass or reversing valve to allow the repumping into the tank 148 of the oil present in the devices 1 before their removal from the driving wheels of a motor vehicle or before the extraction therefrom of the distributor 82.

I claim:
1. An antiskid device for driving motor vehicles on snowy or icy roads, which comprises
   a hub portion securable to the outside of a motor vehicle wheel and formed with an axial recess and a plurality of radial bores angularly spaced apart from one another,
   a peripheral crown including a plurality of curved sectors sequentially articulated to one another and each having roadbed gripping means, thereby forming an uninterrupted deformable rim,
   a plurality of fluid-operated telescopic spoke elements each having one end thereof received in a respective radial bore in the said hub portion and in fluid communication with said axial recess and its other end pivoted to a respective cured sector of the crown, a fluid distributor assembly idly mounted in the said axial recess and arranged to sequentially supply compressed fluid to each radial bore,
   a compressed-fluid source operatively connected to said distributor assembly and arranged to feed compressed fluid to the said fluid-operated telescopic spoke elements to cause the said peripheral crown to expand from a contracted position, in which the said deformable rim is smaller in diameter than the motor vehicle wheel, to an extended working position in which it is larger in diameter,
   return means arranged to urge the said telescopic spoke elements, and thus the peripheral crown to contract from an extended to a contracted position, and
   retention means designed to withstand centrifugal forces, thereby holding the said telescopic spoke elements and thus the said deformable crown in their contracted position while driving on non-snowy or non-icy roads.

2. An antiskid device as claimed in claim 1, wherein the said hub portion comprises a plurality of chambers or channels each of which is in fluid communication with at least one pair of adjacent radial bores thereby allowing fluid to be transfered from a radial bore to at least one adjacent radial bore when a spoke element yieldinly retracts and the peripheral crown deforms under load.

3. An antiskid device as claimed in claim 1, wherein each curved sector in said peripheral crown comprises a pair of said curved sections joined together mutually angularly offset thereby at each end of the sector one curved section projects from the other to delimit offset reduced-thickness ends for articulated connection to respective adjacent curved sectors.

4. An antiskid device as claimed in claim 1, wherein said roadbed gripping means comprises a plurality of spikes protruding from, and spaced along, the external contour of each curved sector.

5. An antiskid device as claimed in claim 1, wherein each telescopic spoke element comprises a cylinder portion at least partly accommodated in a respective radial bore, a piston slidably mounted in said cylinder portion and arranged to be actuated by compressed fluid supplied to the cylinder portion, a piston-rod portion projecting from the cylinder portion and pivoted to a respective curved sector of the crown, and resilient return means for the said piston and piston-rod portion arranged to urge and retract the piston-rod portion into the cylinder portion when compressed-fluid supply is discontinued.

6. An antiskid device as claimed in claim 1, wherein the said fluid distributor assembly comprises a bush or rotor member located in, and rigid in rotation with, said axial recess in the hub portion and having a plurality of mutually angularly spaced ports arranged in circular alignment along an annular region of the bush and each in fluid communication with a respective radial bore, and a stator member sealingly and rotatably mounted in the bush or rotor member and having an inner conduit comprising a longitudinal section in fluid communication with the said compressed-fluid source and a transverse section leading to the said annular region of the rotor member to sequentially supply fluid under pressure to said ports.

* * * * *